J. H. McCORMICK.
DRAW GEAR AND BUFFING APPARATUS.
APPLICATION FILED MAR. 24, 1915.
1,319,883.
Patented Oct. 28, 1919.
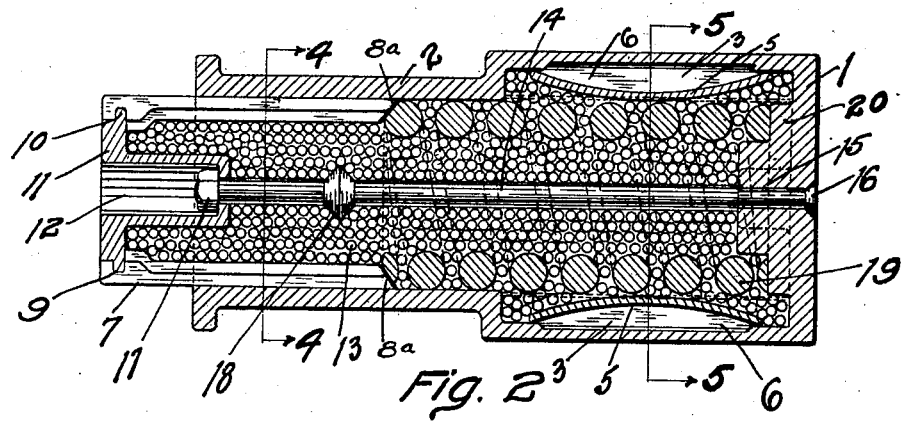
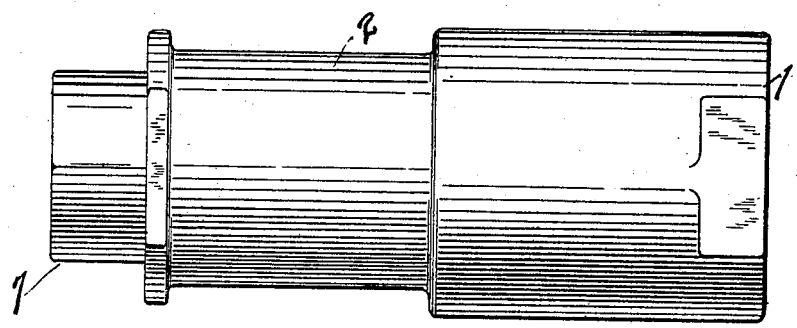
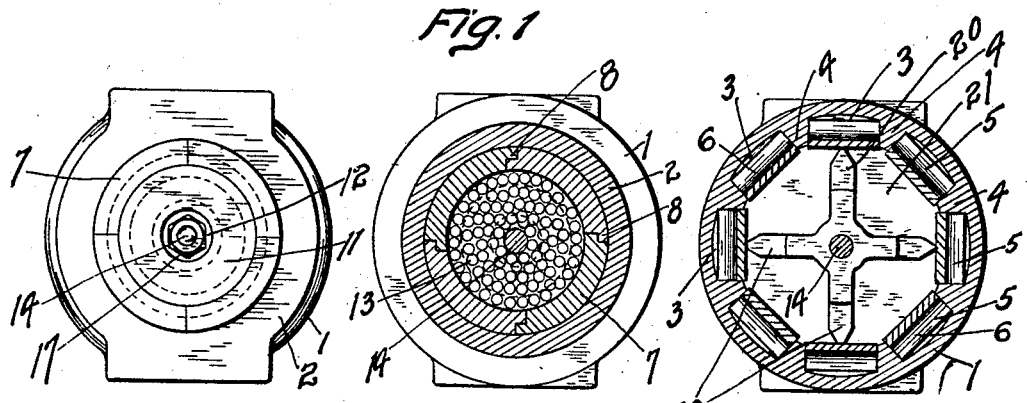
Witnesses
J. C. Merkle
A. L. Phelps
Inventor
John H. McCormick
By
C. C. Shepherd Attorney

UNITED STATES PATENT OFFICE.

JOHN H. McCORMICK, OF COLUMBUS, OHIO, ASSIGNOR TO SAMUEL P. BUSH, OF COLUMBUS, OHIO.

DRAW-GEAR AND BUFFING APPARATUS.

1,319,883.     Specification of Letters Patent.     Patented Oct. 28, 1919.

Application filed March 24, 1915. Serial No. 16,794.

*To all whom it may concern:*

Be it known that I, JOHN H. McCORMICK, a citizen of the United States, residing at Columbus, in the county of Franklin and State of Ohio, have invented certain new and useful Improvements in Draw-Gears and Buffing Apparatus, of which the following is a specification.

My invention relates to cushioning devices used in connection with the draw bars of railroad cars to alleviate, to a certain degree, the shock caused by rapid starting and stopping and also to enable the use of a coupling structure which in itself has practically no lost motion.

The main object of the present invention resides in the production of a gear embodying a mobile mass of friction units, this latter being a plurality of hard friction units, preferably metallic, promiscuously arranged within a housing structure and capable of relative movement with respect to each other and forming a mass which is itself capable of assuming various shapes as occasion demands when the gear, as a whole, is functioning and in the assumption of such shapes, offering the desired resistance. A further feature of importance in this connection when the above principle is carried a step farther resides in an arrangement whereby this mass of units may be made to be the means of an even distribution of the internal forces causing the friction between relatively movable parts of the housing structure or the arrangement may be such that the frictional resistance of the gear is attributable to the relative movement of the various units within the mass as a whole or as a combination of these two.

Still a further object of my invention resides in an arrangement of structure whereby the mobile mass of friction units is given an internal movement together with means for producing a restricted passage through which at least a portion of these units are caused to pass during the cushioning operation of the gear.

A further object of the present invention is the production of a structure embodying supplemental pocketing means normally unoccupied but operative for receiving portions of the mass of friction units when the gear is loaded, to in this manner enable a relative movement among the individual friction units and at the same time maintaining a constant volume of units.

Still another object of my invention resides in the production of a gear wherein the spring structure normally used for maintaining release position of the coöperating friction parts and also for taking a portion of the initial shock, is itself embodied within this mobile mass of friction units in a manner to cause their movement about the spring structure as an individual unit.

The preferred embodiment of my invention is shown in the accompanying sheet of drawings, in which similar characters of reference designate corresponding parts, and in which:

Figure 1 is an outside view of my assembled draft gear shown detached from its rigging, Fig. 2 is a vertical longitudinal section of the structure shown in Fig. 1, Fig. 3 is an end elevation of the structure shown in Figs. 1 and 2 looking toward the right, Fig. 4 is a transverse section taken on line 4—4 of Fig. 2 and looking in the direction of the arrows, and, Fig. 5 is a transverse section taken on line 5—5 of the structure shown in Fig. 2 and looking in the direction of the arrows.

In these drawings, there is shown a casing 1 which casing embodies a forwardly projecting barrel 2, this latter having its interior surface formed to produce an efficient friction surface. The end of the casing opposite from the barrel 2 is somewhat enlarged and is provided with a series of pockets 3, these pockets extending longitudinally of the casing and being separated from each other by the ribs 4, these latter serving the additional purpose of adding strength to the gear as a whole. Within each of these pockets there is located a yielding closure in the nature of bowed leaf springs designated by the numeral 5, these springs having their ends shaped to bear against the top walls of each of the pockets to thereby form a space 6 beneath their centers.

Slidably operating within the barrel portion 2 of the casing is a plunger 7, this plunger being preferably, although not necessarily formed of a plurality of longitudinally extending sections, lap joints of the nature shown at 8 being used between the meeting edges of the various sections. I prefer to form the various sections separately and as a result I have provided the outside ends of each with a groove shown at 9 into which the annular flange 10 of the header 11 is arranged to fit, this header carrying a central socket formation in the end as shown at 12. Thus it will appear that the plunger structure is itself of a substantially hollow nature, whose one end is open and whose opposite end is closed. Likewise, one end of the casing 1 is open and its opposite end is closed and into the space thus formed by the two closed ends of the coöperating parts, I promiscuously arranged a mass of friction units designated individually by the reference numeral 13. These units are preferably in the nature of small iron shot, although it will be apparent that practically any type of unit which in bulk presents a mass or assembly of tangible individual units which is in itself capable of assuming various shapes and which in the assumption of such shapes produces internal friction by the movement of the constituent units over each other, will suffice.

The operation of the device thus far described is as follows: A buffing pressure upon either of the members 1 or 7 will be such as to cause a relative movement between the two and this relative movement is transmitted to the mass of friction units held confined between them. As a result, the tendency is toward the expansion of the various sections forming the plunger 7 to force them into firmer engagement with the coöperating circular wall of the barrel portion 2 and because of the lap joints, these units are prevented from escape should the barrel or plunger wear. The movement between the coöperating surfaces of the barrel 2 and the plunger 7 will, therefore, be accompanied by a great frictional resistance and in order to permit of this movement of the plunger into the barrel, I have provided the supplemental pocketing structure carrying its yielding closure. As the plunger is forced into the casing, the springs 5 will yield to decrease the size of the spaces 6 and the shot or a portion of the friction units will enter the spaces thus created to maintain a constant volume, but to permit of the inward movement of the plunger to create the friction between the relatively moving parts. Also, there will be set up a relative movement between the friction units considered individually which will supplement the frictional resistance created between the plunger and casing. In fact, the use of these friction units without the expansible plunger will form a very efficient gear, reliance being had on the friction caused by the internal movement of the units over each other.

In order to further increase the frictional resistance established by relative movement of the friction units and to increase the expansive pressure of these units, I have provided the casing 1 with a centrally disposed rod 14, this rod being rigidly held by the closed end of the casing by means of its reduced portion, as shown at 15 and the countersunk head 16. This rod extends longitudinally of the gear and slidably passes through the socketed portion 12 of the plunger 7, although its outer end is provided with a nut 17 to limit the amount of separation between the plunger and casing in a manner that must be apparent. This rod is also provided with a double inclined head 18, care being taken to initially locate this head in the hollow space formed by the sections of the plunger. This head 18 is of a diameter somewhat larger than the diameter of the rod 14 and thus serves to create a restricted space for the passage of the friction units as the gear is loaded, it being understood that relative movement between the casing and plunger will cause movement of the head 18 toward the closed end of the plunger and in this manner will dislodge the various friction units in its path and naturally force them to assume different positions. In this manner, the expansive pressure of the mass of friction units as far as the plunger is concerned is increased and at the same time a greater amount of movement between the individual friction units themselves is set up to create a greater internal frictional resistance of the mass.

In order to at all times maintain release position of the gear when unloaded and also to take up the initial shock in a limited way when loaded, I have interposed a coil spring 19 to act directly between the casing and plunger in a manner to tend toward their separation. Recognizing the advantage of impeding the movement of the individual friction units into the supplemental pocket formations to increase the internal resistance of the mobile mass, I have embedded this spring within the mass as a whole. It will be noted that this spring bears against the circular inside inclined edge 8ᵃ of the plunger and at its opposite end against shoulder portions 20, which shoulders are provided to form spaces 21 through which the friction units may also pass during the loading of the gear. By embedding this spring in this manner the individual friction units are caused to pass through the spaces formed by its coils during the loading of the gear and in this manner the internal frictional resistance of the mass is still further augmented, it being understood that after passing through the coils of the springs these friction units may enter the supplemental pocket structures formed by the leaf springs 5.

From the foregoing description, it will be apparent that I have provided a structure whereby the frictional resistance itself is attributable to various causes. The first of these results from the frictional engagement of the plunger 7 with the interior wall of the barrel 2 carried by the casing. Added to this is the movement of the individual units of the mobile mass to form this mass into a different shape by the entrance of portions of these units into the spaces 6. This transformation of shape is accompanied by an expansive pressure of the sections of the plunger and consequently the friction created between the relatively movable surfaces is created as well as a frictional resistance caused by the relative movement of the individual frictional units. This resistance set up within the mass of friction units is increased still further by the use of the head 18 on the centrally disposed rod 15 and at the same time the expansive pressure exerted on the plunger sections is also enhanced because of the restricted passage to the movement of the individual units thus formed. This internal resistance is still further enhanced by embedding the coil spring 19 within the mobile mass, which causes a movement of the individual units about and around the various coils, but permitting them to enter the supplemental pocket formations 6.

It will thus be apparent that I have provided a type of gear which, by small change and variations, may be made to produce a resistance between large limits. While I may consider my specific structure and showing advantageous, variation and modification may be made without in any sense departing from the spirit of the invention and at the same time remaining within the scope of the appended claims, since I claim broadly any construction of gear including a mobile mass of individual friction units. With these units may be combined any one or combination of the novel structures outlined in the foregoing description as may be found desirable or advantageous.

What I claim, is:

1. A friction draw gear and buffing apparatus comprising a casing, a plunger movable in connection therewith, a plurality of solid friction bodies shaped and assembled to form a mobile mass located between said casing and plunger, and a spring operating between said casing and said plunger.

2. A friction draw gear or buffing apparatus comprising a housing structure, a plurality of solid friction bodies shaped and assembled to form a mobile mass located within said structure, and a spring within said housing and embedded in said bodies, said spring being arranged to be compressed under load.

3. A friction draw gear and buffing apparatus comprising a stationary member, a movable member, one of said members being formed in longitudinal sections, said two members being arranged to slide over each other while in frictional engagement, and a plurality of friction bodies shaped and assembled to form a mobile mass arranged to bear against the sections of said sectional member.

4. A friction draw gear and buffing apparatus comprising a casing, a hollow plunger movable within said casing, said plunger being formed in sections running in the direction of its movement to bear on the inside surface of said casing, a plurality of friction bodies shaped and assembled to form a mobile mass located between said plunger and casing and arranged to bear against the inside surface of said plunger, and pocketing means for receiving portions of said mass when the gear is loaded.

5. A friction draw gear and buffing apparatus comprising a casing, a hollow plunger slidable within said casing, said plunger being formed in sections running in the direction of its movement to bear on the inside surface of said casing, and a plurality of friction bodies shaped and assembled to form a mobile mass located between said plunger and casing and arranged to bear against the inside surface of said plunger.

6. A friction draw gear and buffing apparatus comprising a casing, a hollow plunger movable within said casing, said plunger being formed in sections running in the direction of its movement to bear on the inside surface of said casing, a plurality of friction bodies shaped and assembled to form a mobile mass located between said plunger and casing and arranged to bear against the inside surface of said plunger, pocketing means for receiving portions of said mass when the gear is loaded, and means for returning said pocket portions to normal position under normal condition of the gear.

7. A friction draw gear and buffing apparatus comprising a casing, a plunger formed in longitudinal sections, and a plurality of friction bodies shaped and assembled to form a mobile mass located within said plunger in a manner to expand the sections thereof under load.

8. A friction draw gear and buffing apparatus comprising a housing structure, a plurality of friction bodies shaped and assembled to form a mobile mass located within said structure, and a headed pin structure movable through said mass under load.

9. A friction draw gear and buffing apparatus comprising a housing structure, a plurality of friction bodies shaped and assembled to form a mobile mass located within said structure, a headed pin structure movable within said mass under load, and supplemental pocketing means for receiving portions of said mass under load.

10. A friction draw gear and buffing apparatus comprising a housing structure, a plurality of friction bodies shaped and assembled to form a mobile mass located within said structure, a headed pin structure movable through said mass under load, supplemental pocketing means for receiving portions of said mass under load, and means for returning said pocketed portions to normal position under normal condition of the gear.

11. A friction draw gear and buffing apparatus comprising a casing, a hollow plunger formed in longitudinal sections movable within said casing, a plurality of friction bodies shaped and assembled to form a mobile mass located and held confined within said plunger and said casing, supplemental pockets for receiving portions of said mass under load, and means for returning said pocket portions to normal position under normal condition of the gear.

12. A friction draw gear and buffing apparatus comprising a casing, a plunger formed in longitudinal sections movable within said casing, a plurality of friction bodies shaped and assembled to form a mobile mass located and held confined between said casing and said plunger, a supplemental pocket structure, and spring controlled means for said structure for resisting entrance of portions of said mass under load.

13. A friction draw gear and buffing apparatus comprising a casing, a plunger formed in longitudinal sections movable within said casing, a plurality of friction bodies shaped and assembled to form a mobile mass located and held confined between said casing and said plunger, a supplemental pocket structure, spring controlled means for said structure for resisting entrance of portions of said mass under load, and a release spring bearing directly between said casing and said plunger.

14. A friction draw gear and buffing apparatus comprising a casing, a plunger operable within said casing, a plurality of solid friction units assembled and held confined between said casing and said plunger, and means for forming a restricted passage through which at least a portion of said friction units is forced during relative movement of said casing and said plunger under load.

15. A friction draw gear and buffing apparatus comprising a housing structure, a plurality of solid friction units within said structure, and means for forming a restricted passage through which at least a portion of said units are forced to pass when the gear is loaded.

16. A friction draw gear and buffing apparatus comprising a casing, a hollow plunger formed in longitudinal sections slidable within said casing, a plurality of friction bodies shaped and assembled to form a mobile mass located and held confined between said casing and said plunger, and means for forming a restricted passage in the hollow portion of said plunger through which a portion of said units are forced to pass when the gear is loaded.

17. A friction draw gear and buffing apparatus comprising a housing, a plurality of solid friction units within said housing, means within the housing forming a restricted passage through which a portion of said units are forced when the gear is under pressure, and supplemental pocketing means also within the housing into which a portion of said units are forced under load.

18. A friction draw gear and buffing apparatus comprising a housing, a plurality of solid friction units within said housing, means within the housing forming a restricted passage through which a portion of said units are forced when the gear is under pressure, supplemental pocketing means also within the housing into which a portion of said units are forced under load, and means for returning said pocketed portions to normal position under normal condition of the gear.

19. A friction draw gear and buffing apparatus comprising a casing, a hollow plunger formed in longitudinal sections slidable within said casing, lap joints between the various sections of said plunger, and a plurality of friction bodies shaped and assembled to form a mobile mass located and held confined between said casing and said plunger.

20. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said casing and said plunger, and supplemental pocketing means for receiving a portion of said bodies when the gear is loaded.

21. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said casing and said plunger, and a coil spring embedded in said bodies and arranged to bear directly between said casing and said plunger.

22. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said plunger and said casing, a coil spring embedded in said bodies and arranged to bear directly between said casing and said plunger, a rod held rigid by said casing in a central position therein, and a head on said rod forming a restricted passage in said plunger.

23. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said plunger and said casing, said casing being formed with a series of pockets around its inner periphery into which a portion of said bodies are forced under load, and yielding means for normally covering said pockets against the entrance of said bodies.

24. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said plunger and said casing, said casing being formed with a series of pockets around its inner periphery into which a portion of said bodies are forced under load, yielding means for normally covering said pockets against the entrance of said bodies, a rod held rigid by said casing in a central position and slidable through said plunger, and a head on said rod located in said plunger to form a restricted passage for said bodies.

25. A friction draw gear and buffing apparatus comprising a casing, a hollow plunger formed in longitudinal sections slidable within said casing, lap joints between the various sections of said plunger, a plurality of friction bodies shaped and assembled to form a mobile mass located and held confined between said plunger and said casing, said casing being formed with a series of pockets around its inner periphery into which a portion of said bodies are forced under load, yielding means for normally covering said pockets against the entrance of said bodies, a rod held rigid by said casing in a central position and slidable through said plunger, a head on said rod located in said plunger to form a restricted passage for said bodies, and a coil spring embedded in said bodies and arranged to bear directly between said casing and said plunger.

26. A friction draw gear and buffing apparatus comprising a casing, a hollow plunger formed in longitudinal sections slidable within said casing, lap joints between the various sections of said plunger, said casing being formed with a series of pockets around its inner periphery, spring means normally covering the open portions of said pockets to form a yielding cover therefor, a plurality of friction bodies shaped and assembled to form a mobile mass located and held confined between said casing and said plunger, a coil spring embedded in said bodies and arranged to bear directly between said casing and said plunger, a rod rigidly held by said casing in central position, said rod being arranged to extend longitudinally of the gear and slidable and centrally passing through said plunger, and a headed portion on said rod located within said plunger when in normal release position and arranged to form a restricted passage for said bodies when the gear is loaded.

27. A friction draft gear or buffing apparatus comprising a housing structure, a plurality of solid friction units confined within said structure, a supplemental pocketing structure into which a portion of said units are forced under load, and means for clearing said pocket structure of said units when the gear is unloaded.

28. A friction draw gear and buffing apparatus comprising a casing, a plunger operable within said housing, a plurality of friction bodies shaped and assembled to form a mobile mass located and operatively confined between said plunger and said casing, said casing and said plunger being constructed relatively to prevent the escape of any of said bodies between them under wear.

In testimony whereof I affix my signature in presence of two witnesses.

JOHN H. McCORMICK.

Witnesses:
WALTER E. L. BOCK,
A. L. PHELPS.

Copies of this patent may be obtained for five cents each, by addressing the "Commissioner of Patents, Washington, D. C."